United States Patent
Zhang et al.

(10) Patent No.: US 9,115,616 B2
(45) Date of Patent: Aug. 25, 2015

(54) ELECTRIC HEATING ASSISTED PASSIVE AND ACTIVE REGENERATION FOR EFFICIENT EMISSION CONTROLS OF DIESEL ENGINES

(71) Applicant: Watlow Electric Manufacturing Company, St. Louis, MO (US)

(72) Inventors: Wenzhong Zhang, Savage, MN (US); Mike Bange, Elsberry, MO (US); Scott Boehmer, Hannibal, MO (US); Magdi Khair, San Antonio, TX (US); Julian Tan, Vernon Hills, IL (US)

(73) Assignee: Watlow Electric Manufacturing, St. Louis, MO (US)

( * ) Notice: Subject to any disclaimer, the term of this patent is extended or adjusted under 35 U.S.C. 154(b) by 156 days.

(21) Appl. No.: 13/773,176

(22) Filed: Feb. 21, 2013

(65) Prior Publication Data

US 2013/0213010 A1 Aug. 22, 2013

Related U.S. Application Data

(60) Provisional application No. 61/601,923, filed on Feb. 22, 2012.

(51) Int. Cl.
| | |
|---|---|
| *F01N 3/00* | (2006.01) |
| *F01N 9/00* | (2006.01) |
| *F01N 3/027* | (2006.01) |

(Continued)

(52) U.S. Cl.
CPC ...... *F01N 9/00* (2013.01); *F01N 3/027* (2013.01); *F01N 3/2013* (2013.01); *F01N 9/002* (2013.01); *F01N 13/009* (2014.06); *F01N 2240/16* (2013.01); *F01N 2590/08* (2013.01);

(Continued)

(58) Field of Classification Search
CPC ..... F02D 41/029; F01N 9/002; F01N 3/0842; F01N 3/035; F01N 13/02
USPC ............ 60/274, 285, 286, 295, 297, 311
See application file for complete search history.

(56) References Cited

U.S. PATENT DOCUMENTS

| | | | | |
|---|---|---|---|---|
| 5,746,989 A | * | 5/1998 | Murachi et al. ............ 423/213.7 |
| 6,311,480 B1 | * | 11/2001 | Suzuki et al. ................... 60/276 |

(Continued)

FOREIGN PATENT DOCUMENTS

| | | | | | |
|---|---|---|---|---|---|
| DE | 10131336 A1 | * | 1/2003 | .............. F01N 3/025 |
| JP | 2002266625 A | * | 9/2002 | ................ F01N 3/02 |
| JP | 2010265862 A | * | 11/2010 | |

OTHER PUBLICATIONS

Machine Translation of DE 10131336, Translated on Dec. 15, 2014.*

(Continued)

*Primary Examiner* — Thomas Denion
*Assistant Examiner* — Patrick Maines
(74) *Attorney, Agent, or Firm* — Brinks Gilson & Lione

(57) ABSTRACT

A method of heating an exhaust gas in an exhaust aftertreatment system including a Diesel Oxidation Catalyst (DOC) and a diesel particulate filter (DPF) is provided. The method includes heating the exhaust gas to a predetermined temperature to increase $NO_2$ generation in the DOC when the DPF is not actively regenerated, and heating the exhaust gas to reduce an exhaust temperature gradient when the DPF is actively regenerated. The exhaust temperature gradient is reduced by providing more heat proximate a wall of an exhaust conduit and less heat proximate a center of the exhaust conduit.

11 Claims, 7 Drawing Sheets

(51) Int. Cl.
*F01N 3/20* (2006.01)
*F01N 13/00* (2010.01)

(52) U.S. Cl.
CPC .......... *F01N2900/1404* (2013.01); *Y02T 10/26* (2013.01); *Y02T 10/47* (2013.01)

(56) References Cited

U.S. PATENT DOCUMENTS

| | | | |
|---|---|---|---|
| 2006/0156702 A1* | 7/2006 | Cheng | 55/523 |
| 2008/0078170 A1* | 4/2008 | Gehrke et al. | 60/295 |
| 2009/0193794 A1* | 8/2009 | Robel et al. | 60/295 |
| 2010/0205943 A1* | 8/2010 | Gonze et al. | 60/286 |
| 2010/0290957 A1* | 11/2010 | Yoshida et al. | 422/109 |
| 2010/0326403 A1 | 12/2010 | Gonze et al. | |
| 2011/0000194 A1 | 1/2011 | Gonze et al. | |
| 2011/0016848 A1* | 1/2011 | Brooks | 60/274 |
| 2011/0030554 A1 | 2/2011 | Gonze et al. | |

OTHER PUBLICATIONS

International Search Report dated Jun. 11, 2013 issued in PCT/US2013/027142.

* cited by examiner

Concentration of NO$_2$ with Diesel Oxidation Catalyst

| | Engine Model | QST30-G5 |
|---|---|---|
| | Rated Engine Standby HP | 1,490 |
| | Rated Genset Standby kWe | 1000 |
| NTE Limits Tier 4i | NOx* | 0.5 |
| | HC* | 0.3 |
| | CO* | 2.6 |
| | PM*(1) | 0.07 |
| NTE Limits Tier 4 | NOx* | 0.5 |
| | HC* | 0.14 |
| | CO* | 2.6 |
| | PM*(1) | 0.02 |
| 10% Load | Flow (cfm) | 1925 |
| | Temp (F) | 455 |
| | NOx* | 6.8 |
| | HC* | 0.34 |
| | CO* | 2.3 |
| | PM*(1) | 0.18 |
| 25% Load | Flow (cfm) | 2745 |
| | Temp (F) | 620 |
| | NOx* | 5.14 |
| | HC* | 0.13 |
| | CO* | 0.66 |
| | PM*(1) | 0.19 |
| 50% Load | Flow (cfm) | 4595 |
| | Temp (F) | 760 |
| | NOx* | 3.88 |
| | HC* | 0.11 |
| | CO* | 0.37 |
| | PM*(1) | 0.15 |
| 75% Load | Flow (cfm) | 6445 |
| | Temp (F) | 815 |
| | NOx* | 3.97 |
| | HC* | 0.09 |
| | CO* | 0.47 |
| | PM*(1) | 0.12 |
| 100% Load | Flow (cfm) | 7660 |
| | Temp (F) | 895 |
| | NOx* | 4.16 |
| | HC* | 0.07 |
| | CO* | 0.68 |
| | PM*(1) | 0.11 |

FIG. 6

ELECTRIC HEATING ASSISTED PASSIVE AND ACTIVE REGENERATION FOR EFFICIENT EMISSION CONTROLS OF DIESEL ENGINES

CROSS-REFERENCE TO RELATED APPLICATION

This application claims the benefit of U.S. Provisional Patent Application Ser. No. 61/601,923, entitled "Electric Heating Assisted Passive and Active Regeneration for Efficient Emission Controls of Diesel Engines," filed Feb. 22, 2012, the content of which is incorporated herein by reference in its entirety.

FIELD

The present disclosure relates to exhaust aftertreatment systems for diesel engines, and more particularly to electric heating and control to provide assisted heating in the exhaust aftertreatment systems.

BACKGROUND

The background description provided herein is for the purpose of generally presenting the context of the disclosure and may not constitute prior art.

Diesel engines have been used in a variety of applications such as locomotives, marines and engine-generators. The U.S. Environmental Protection Agency (EPA) and the California Air Resources Board (CARB), as well as other regulatory agencies around the world, impose strict limitations on the contents of emissions from diesel engines, such as particulate matter (PM), hydrocarbon (HC) and NOx. Accordingly, exhaust aftertreatment systems have been employed and generally include a Diesel Oxidation Catalyst (DOC), a Diesel Particulate Filter (DPF), and an SCR (Selective Catalytic Reduction of NOx) to treat the exhaust gas and to control emissions to atmosphere or the outside environment.

Various chemical reactions occur in the DOC and SCR to convert harmful nitrogen oxides (NOx), carbon monoxide (CO), and unburned hydrocarbon (HC) into $N_2$, $CO_2$ and water. The DPF is designed to remove diesel particulate matter (PM) from the exhaust gas. Normally these chemical reactions would take place at high temperatures. With the use of catalysts, the chemical reactions can occur at much lower temperatures. Sufficient energy in the form of heat, however, must still be supplied to the catalysts to expedite the chemical reactions. Therefore, performance of the exhaust aftertreatment system is highly dependent on the temperature of the exhaust gas, which carries the desired energy and heat to the catalysts. The normal temperature of the exhaust gas, however, does not always meet requirements for the desired chemical reactions. When the normal exhaust temperature is lower than the target temperature, the exhaust aftertreatment system cannot effectively treat the exhaust gas, resulting in higher emissions to the outside environment.

One method of increasing the exhaust gas temperature is through injecting hydrocarbon upstream from a DOC either in the exhaust pipe or inside the cylinder during the exhaust stroke. This method increases fuel consumption and also changes composition of the exhaust gas. For example, when fuel injection is injected in the exhaust, $NO_2$ generation in the DOC is significantly reduced. $NO_2$ is an effective reagent for passive regeneration of DPF at much lower temperature range. Therefore, the reduced $NO_2$ generation adversely affects the passive regeneration of the DPF.

SUMMARY

In one form, a heater control module for controlling an electric heater in an exhaust aftertreatment system is provided. The exhaust aftertreatment system includes a Diesel Oxidation Catalyst (DOC) and a Diesel Particulate Filter (DPF). The heater control module includes a heating mode determination module and a heater operating module. The heating mode determination module selects a desired heating mode from a plurality of heating modes based on an engine load and a status of the DPF. The heater operating module operates the electric heater based on the desired heating mode.

In another form, a method of heating an exhaust gas in an exhaust aftertreatment system including a Diesel Oxidation Catalyst (DOC) and a Diesel Particulate Filter (DPF) is provided. The method includes heating the exhaust gas to a predetermined temperature to increase $NO_2$ generation in the DOC when the DPF is not actively regenerated and when the engine load is low, and heating the exhaust gas to reduce an exhaust temperature gradient when the DPF is actively regenerated. The increased $NO_2$ generation facilitates passive regeneration of the DPF. The exhaust temperature gradient is reduced by providing more heat proximate a wall of an exhaust conduit and less heat proximate a center of the exhaust conduit. The efficiency of the active regeneration of the DPF can be required heat for active regeneration of DPF can be increased due to more efficient burning of PM at the peripheral channels of the DPF.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale. In the drawings:

FIG. 6 is a table showing the properties of the exhaust gas at different engine loads.

DETAILED DESCRIPTION

The following description is merely exemplary in nature and is in no way intended to limit the present invention, its application, or uses. It should also be understood that steps within a method may be executed in different order without altering the principles of the invention.

Figure 1:
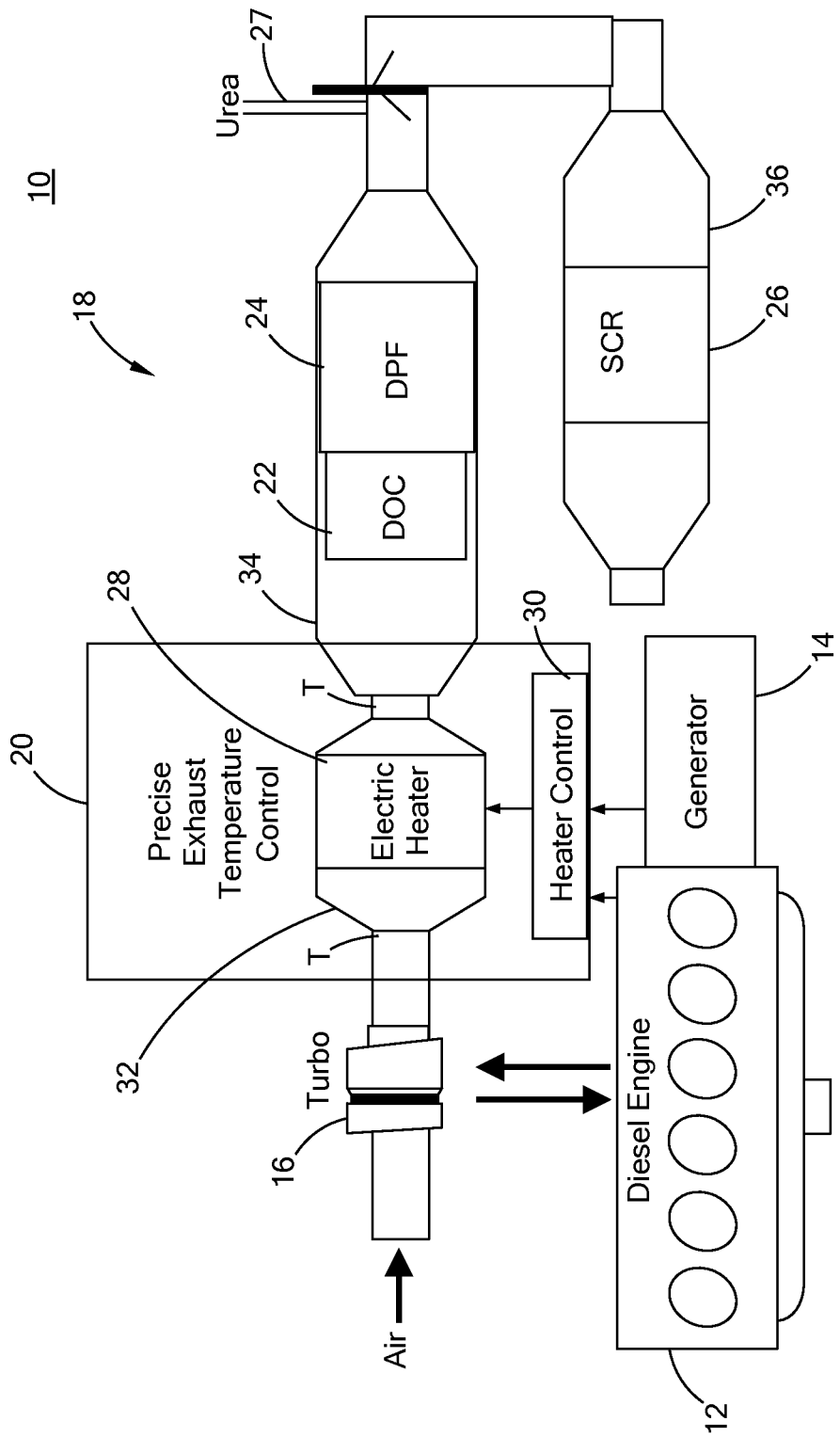
FIG. 1 is a schematic view of an engine system including a heating module constructed in accordance with the teachings of the present disclosure.

Referring to FIG. 1, an engine system 10 generally includes a diesel engine 12, a generator 14, a turbocharger 16, and an exhaust aftertreatment system 18. The exhaust aftertreatment system 18 is disposed downstream from a turbocharger 16 for treating exhaust gases from the diesel engine 12 before the exhaust gases are released to atmosphere. The exhaust aftertreatment system 18 includes a heating module 20, a DOC 22, DPF 24, and an SCR 26. The heating module 20 includes an electric heater 28 disposed upstream from the DOC 22, and a heater control module 30 for controlling operation of the electric heater 28. The exhaust aftertreatment system 18 includes an upstream exhaust conduit 32 that receives the electric heater 28 therein, an intermediate exhaust conduit 34 in which the DOC 22 and DPF 24 are received, and a downstream exhaust conduit 36 in which the SCR is disposed.

The DOC 22 is disposed downstream from the electric heater 28 and serves as a catalyst to oxide carbon monoxide and any unburnt hydrocarbons in the exhaust gas. In addition, The DOC 22 converts harmful nitric oxide (NO) into nitrogen dioxide ($NO_2$). The DPF 24 is disposed downstream from the DOC 22 to remove diesel particulate matter (PM) or soot from the exhaust gas. The SCR 26 is disposed downstream from the DPF 24 and, with the aid of a catalyst, converts nitrogen oxides (NOx) into nitrogen ($N_2$) and water. A urea water solution injector 27 is disposed downstream from the DPF 24 and upstream from the SCR 26 for injecting urea water solution into the stream of the exhaust gas. When urea water solution is used as the reductant in the SCR 18, NOx is reduced into $N_2$, $H_2O$ and $CO_2$ in the following reaction:

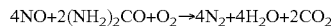

$$4NO+2(NH_2)_2CO+O_2 \rightarrow 4N_2+4H_2O+2CO_2$$

The electric heater 28 provides assisted heating of the exhaust gas flowing in the exhaust conduits 32, 34, 36. The generator 14 is connected to the diesel engine 12 to drive the diesel engine 12 during engine startup as an option and to supply electricity to the electric heater 34 during normal engine operation. The heater control module 30 strategically controls the electric heater 28 in different heating modes to facilitate both active and passive regeneration of the DPF 24.

Regeneration is the process of burning and removing the accumulated particulates matters from the DPF 24. Regeneration can occur passively or actively. Passive regeneration can occur in normal engine operation when the temperature of the exhaust gas is sufficiently high. Active regeneration can occur based on a monitored DPF condition or based on a predetermined timing schedule by introducing very high heat to the exhaust aftertreatment system 10. Active regeneration can be achieved by proper engine control management to increase the exhaust temperature through late fuel injection or injection during the expansion stroke. Active regeneration can also be achieved through assisted heating by an electric heater. Active regeneration requires much more heat than passive regeneration and thus subjects the ceramic structure of the DPF 24 to the risk of cracking and decreases catalytic coating life time.

Figure 2:
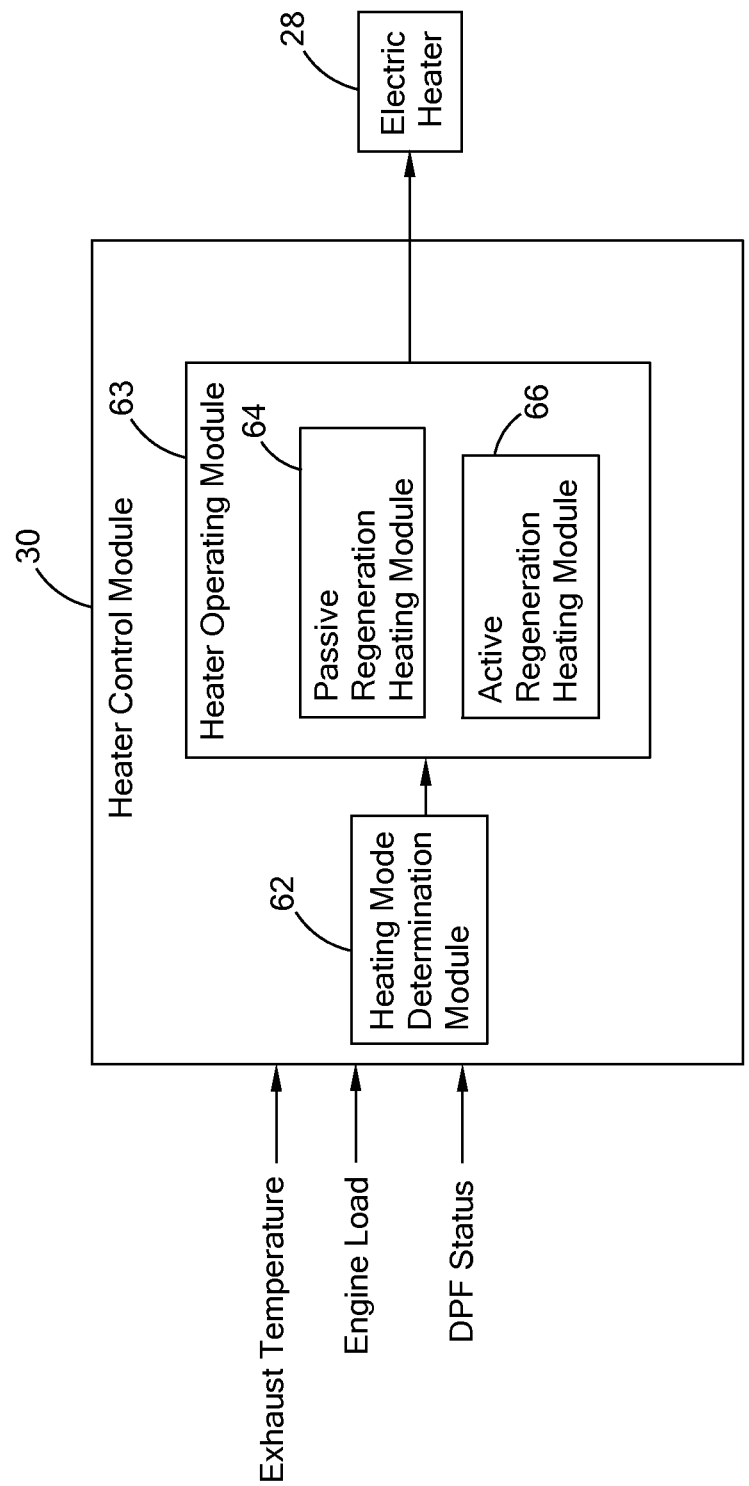
FIG. 2 is a schematic view of a heating module constructed in accordance with the teachings of the present disclosure.

Referring to FIG. 2, the heater control module 30 strategically controls operation of the electric heater 28 based on an engine load and a status of the DPF 24 to provide assisted heating in both active and passive regeneration of the DPF. The heater control module 24 may be a part of an engine control unit (ECU) (not shown) or external to the ECU. The ECU controls operation of the diesel engine 12, a fuel injection system (not shown), among others, and acquires and stores various parameters relating to engine operating conditions, including but not limited to, exhaust temperature, diesel engine load, flow conditions (air flow and air pressure etc.) The heater control module 30 receives inputs from the ECU to make the proper determination how to operate the electric heater 28. The control module could also receive information from stand alone after treatment control systems.

The heater control module 30 includes a heating mode determination module 62 and a heater operating module 63 including a passive regeneration heating module 64 and an active regeneration heating module 66. The electric heater 22 can be operated in two operating modes: passive regeneration heating mode and active regeneration heating mode. The heating mode determination module 62 determines a desired heating mode based on an engine load and the status of the DPF 24. When the DPF 24 is actively regenerated, the desired heating mode is the active regeneration heating mode. When the DPF 24 is not actively regenerated and the engine load is low, for example, at 10%, the desired heating mode is the passive regeneration heating mode. The heating mode determination module 62 may include a heating strategy that specifies the correlation among the heating modes, duration, engine loads and the desired exhaust temperature rise. The heating mode determination module 62 also determines when the electric heater 28 should be turned on or off during normal engine operation. In response to the determination of the heating mode determination module 62, the heater operating module 63 operates the electric heater 28 accordingly.

In the passive regeneration heating mode, the electric heater 28 is controlled to heat the exhaust gas to a predetermined temperature which allows for optimum $NO_2$ generation in the DOC 22. $NO_2$ is an effective reactant for passive regeneration of DPF 24. Increasing $NO_2$ generation can facilitate passive regeneration of DPF 24. In the active heating mode, the electric heater 28 is controlled to heat the exhaust gas differently to reduce exhaust temperature gradient across the exhaust conduits. When the temperature gradient is reduced, the active regeneration can be accomplished more efficiently.

When the heating mode determination module 62 determines that the passive heating mode is desired, the passive regeneration heating module 64 then controls the electric heater 28 to heat the exhaust gas to a predetermined temperature. The passive regeneration heating module 64 calculates and determines the desired temperature rise based on an exhaust temperature and the predetermined temperature. The exhaust temperature may be obtained from the input from the ECU, temperature sensors. The predetermined temperature depends on the properties of the catalysts in the DOC 14 and is set to allow for optimum NO2 generation.

Figure 3:
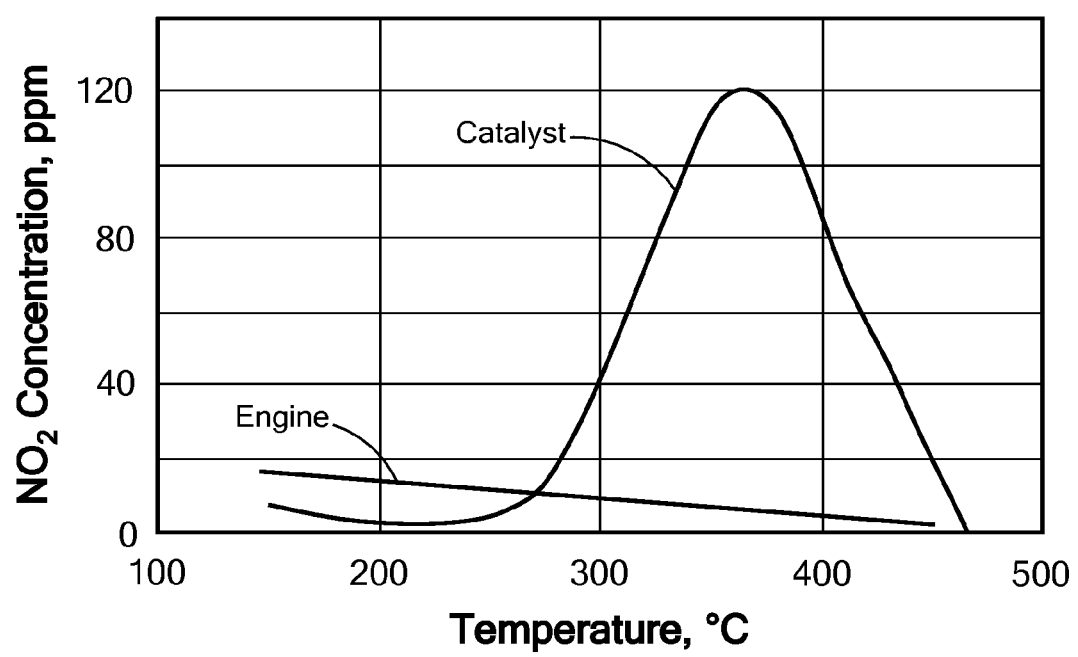
FIG. 3 is a graph showing relationship between concentration of $NO_2$ and catalyst temperature.

Referring to FIG. 3, the $NO_2$ concentration at the outlet of the DOC 14 is dependent on the temperature of the exhaust gas. For a BASF DOC catalyst, the $NO_2$ concentration is relatively high when the catalyst temperature is in the range of 300 to 460° C., particularly in the range from 320 to 380° C. Therefore, the predetermined temperature is set to be in the range of 300 to 460° C., and preferably in the range from 320 to 380° C. When the electric heater 28 heats exhaust gas to the predetermined temperature, an optimum amount of $NO_2$ is generated to facilitate passive regeneration of the DPF 24. With the extensive passive regeneration of DPF, the particulate matter is accumulated on the DPF at a lower rate, thereby reducing the frequency for active regeneration. As a result, the likelihood of DPF ceramic cracking and degradation of the catalysts due to high heat associated with active regeneration (generally in the range of 500 to 650° C.) are reduced.

Referring back to FIG. 2, when the DPF 24 is actively regenerated, the desired heating mode is the active regeneration heating mode. The active regeneration heating module 66 controls the electric heater 28 to provide differential heating to the exhaust gas. The electrical heater 22 generates more heat along the periphery of the electric heater and less heat at the center of the exhaust conduit.

The exhaust conduit generally has a relatively higher temperature along the central axis of the conduit and a relatively lower temperature proximate the conduit wall. To ensure effective active regeneration across the DPF 24, the exhaust gas proximate the exhaust conduit wall also needs to be heated to the desired active regeneration temperature. Due to the temperature gradient across the cross section of the exhaust conduit, the exhaust gas proximate the center of the exhaust conduit is unnecessarily overheated, subjecting the center portion of the DPF 24 to higher heat and higher risk of cracks. By operating the electric heater 28 to reduce the temperature gradient, less heat is required to heat the exhaust gas to the desired active regeneration temperature. Therefore, the likelihood of overheating at the center of the DPF and the accompanying problems is reduced.

Figure 4:
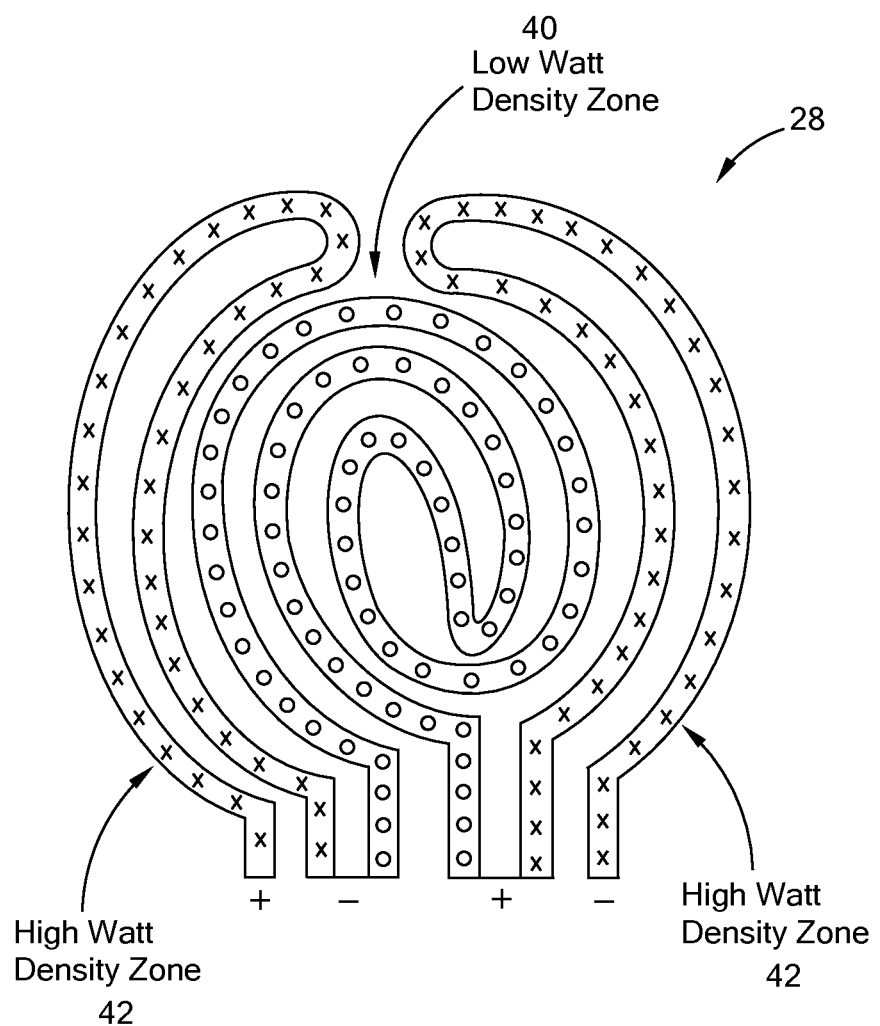
FIG. 4 is a schematic view of an electric heater.

Referring to FIG. 4, an exemplary embodiment of the electric heater 28 is shown to have a low watt density zone 40 proximate the center and a high watt density zone 42 along the periphery of the electric heater 28. The electric heater 28 can provide differential heating across the exhaust conduit.

The electric heater 28 is powered by the generator 32. The generator 32 drives the diesel engine 30 during engine startup. After the diesel engine 30 starts to operate on its own, the generator 30 is driven by the diesel engine 30 to generate electricity to power other electronics or electrical devices. The heating strategy allows for use of available electricity generating capacity when it is not needed to power the other electrical and electronic systems during low engine load operation.

Figure 5:
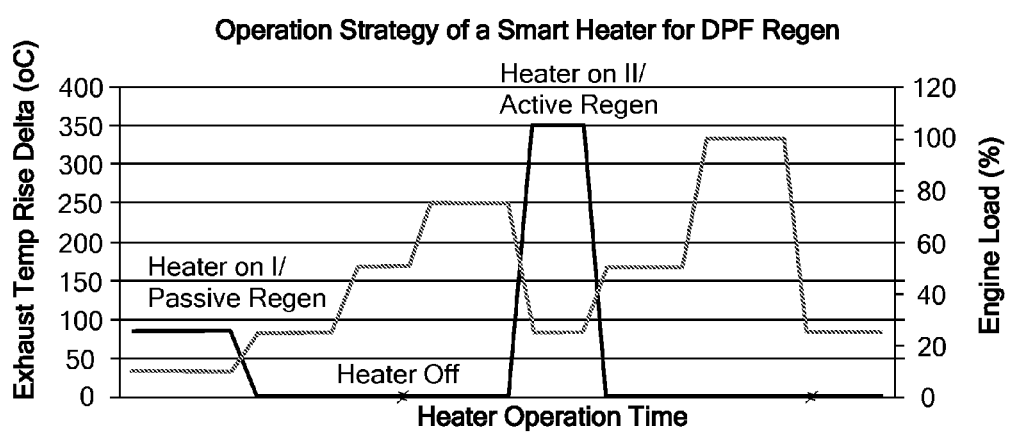
FIG. 5 is a graph showing a heating strategy for operating the electric heater.
Figure 7:
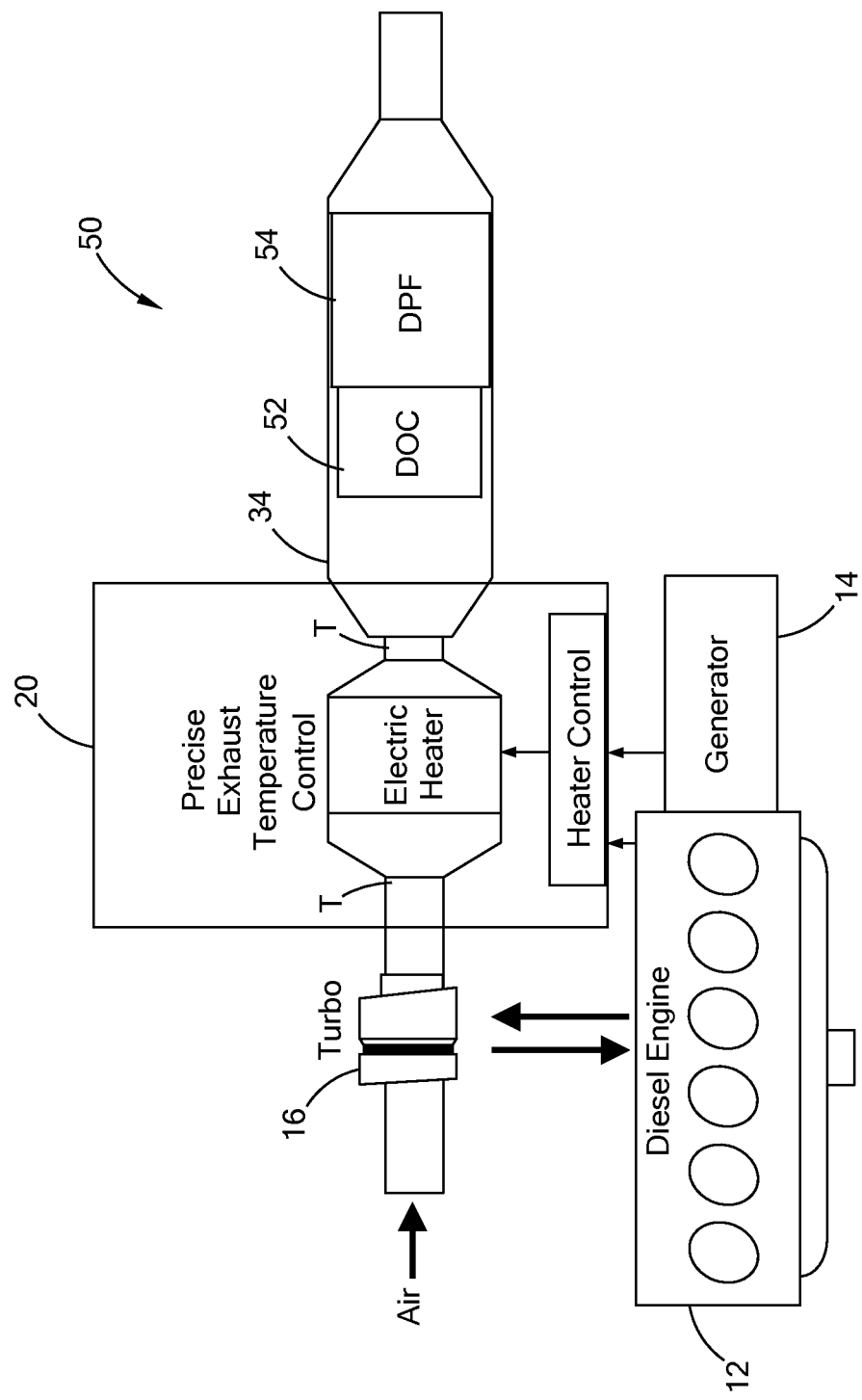
FIG. 7 is a schematic view of another form of an engine system including a heating module constructed in accordance with the teachings of the present disclosure.

Referring to FIG. 5, the heating mode determination module 32 includes a heating strategy which specifies the correlations among the heating modes, the exhaust temperature rise, the engine loads. As shown in the exemplary diagram, when the engine load is low and the DPF backpressure is in the range of medium to high, the target exhaust temperature rise (delta) would be low and the electric heater 28 is operated in the passive regeneration mode. For example, the electric heater 22 is in the passive regeneration heating mode when the diesel engine 30 is operating near low load conditions such as 10% load. The electric heater 22 demands less electric power from the generator 32 because the desired temperature rise (delta) is less than that for active regeneration and because less exhaust gas is generated from the diesel engine 30 due to the low engine load.

As the engine load continues to increase, for example, from 10% to 25%, to 50%, to 75%, the electric heater 22 is turned off. Active regeneration of DPF may be initiated when the engine load is low or according to a predetermined schedule to benefit from heating lower exhaust mass flow. When the DPF is actively regenerated, for example, at an engine load of 25%, the electric heater is turned on and operated in the active regeneration heating mode to provide differential heating. When the active regeneration is completed and the engine load starts to increase, the electric heater 28 is turned off.

Referring to FIG. 6, the table illustrates the exhaust contents for different load conditions. As shown, when the diesel engine is operated under the 10% load condition, the exhaust gas exhibits the lowest exhaust flow (1925 cfm) and the highest available specific NOx (6.8 g/bhp-hr) among the 5 load conditions for a gen-set type of large diesel engine. For example, had the exhaust temperature been raised from 235 C (455 F) to a temperature that is within the DOC's NO2 generation sweet temperature window of 320 to 380° C., the DOC downstream of the heater will generate maximum amount of $NO_2$ due to higher available NOx under this load engine condition. $NO_2$ passively oxidizes the particulate matter loaded DPF downstream of the DOC at its maximum rate. Additionally, the delta T rise is only 85° C. which will minimize energy consumption in comparison with an active regeneration which will have a delta T as high as 350° C.

For the 10% load condition on this Gen-set with a flow of 81.6 kg/min, it will require 121 KW energy input to heat the exhaust and have a delta T rise of 85° C. It will need 450 KW to heat the exhaust up to 550° C. at 25% load condition with a flow of 137.3 kg/min.

For the notch 1 condition on a GE locomotive engine with a flow of 54.8 kg/min, it will require 73 KW energy input to heat the exhaust and have a temperature rise (delta) of 76° C. up to 355° C. It will need 315 KW to heat the exhaust up to 607° C. at the same notch 1 condition.

With the extensive passive regeneration, the accumulation of the soot and PMs on the DPF 16, as well as the backpressure of the DPF, are reduced. As a result, the active regeneration periods and frequencies can be significantly reduced, thereby enhancing durability of the expensive DPF. The electric heating strategy of the present disclosure may replace the fuel-injection-based active regeneration.

Referring to FIG. 6, the heating module 20 of the present disclosure applies to all diesel engines which can generate electricity while in operation, preferably to those non-EGR diesel engines having high engine-out NOx at lower duty cycles. As shown, the heating module 20 can be applied to a catalyzed DPF only exhaust system, as well as an exhaust aftertreatment system 50 that includes DOC 52 and DPF 54 without SCR.

The heating module 20 of the present disclosure has at least the following benefits:

1. Utilizing available electricity generating capacity when it is not needed for other operations on a diesel-generator or a marine engine or a locomotive at low load to assist in passively regenerating the DPF as part of the engine's emission control system.

2. Reducing the frequency of diesel fuel injection based active regeneration and hence enhancing fuel economy of the engine operation.

3. Reducing DPF operational soot loading through heating assisted passive regeneration to minimize overall operational backpressure.

4. Reducing risks of DPF cracking caused by soot overloaded runaway regenerations through heating assisted passive regeneration.

5. Improving exhaust aftertreatment system's performance through delivering more uniform exhaust temperatures across the system's inlet face.

Additionally, the present disclosure may include methods of heating portions of the gas flow in a more indirect matter. For example, the system could sense cooler portions within the gas flow cross section and provide heat where needed to provide a more even temperature distribution and compensate for heat losses. In addition, for systems that require more electricity than is available to regenerate the entire gas stream cross-section, the system may regenerate in certain sections or zones at different times. These alternate forms of the present disclosure would also have a corresponding heater type that supports zone heating across the cross-section of gas flow, such as, by way of example, layered heaters or modular heat trace heaters such as those disclosed in pending U.S. application Ser. No. 11/238,747 titled "Modular Layered Heater System" and in U.S. Pat. No. 7,626,146 titled "Modular Heater Systems," both of which are commonly assigned with the present application and the contents of which are incorporated by reference herein in their entirety.

The broad teachings of the disclosure can be implemented in a variety of forms. Therefore, while this disclosure includes particular examples, the true scope of the disclosure should not be so limited since modifications will become apparent from the following claims.

What is claimed is:

1. A heater control module for controlling an electric heater to control exhaust temperature in an exhaust aftertreatment system including a diesel oxidation catalyst (DOC) and a diesel particulate filter (DPF), the heater control module comprising:
a heating mode determination module that selects a desired heating mode from a plurality of heating modes based on an engine load and a status of the DPF; and
a heater operating module that operates the electric heater based on the desired heating mode,
wherein the plurality of desired heating modes includes at least a passive regeneration heating mode and an active regeneration heating mode, and the electric heater is operated in the passive regeneration heating mode to heat the exhaust gas to a predetermined temperature to increase NO2 regeneration when the DPF is not actively regenerated and an engine load is less than or equal to 10%.

2. The heater control module according to claim 1, wherein the electric heater is operated in the active regeneration heating mode to provide differential heating when the DPF is actively regenerated.

3. The heater control module according to claim 2, wherein the electric heater is operated in the active regeneration heating mode to reduce a temperature gradient across an exhaust conduit.

4. The heater control module according to claim 2, wherein the electric heater is operated to provide differential heating to reduce a temperature gradient across an exhaust conduit.

5. The heater control module according to claim 4, wherein the electric heater includes a lower watt density zone and a higher watt density zone.

6. The heater control module according to claim 5, wherein the differential heating of the electric heater generates more heat proximate a periphery of the heater and less heat proximate a center of the exhaust conduit.

7. The heater control module according to claim 5, wherein the higher watt density zone is proximate a periphery of the electric heater.

8. The heater control module according to claim 5, wherein the lower watt density zone is proximate a center of the electric heater.

9. The heater control module according to claim 1, wherein the predetermined temperature is a function of properties of catalysts in the DOC.

10. The heater control module according to claim 1, wherein the predetermined temperature is in a range from 300 to 460° C.

11. The heater control module according to claim 1, wherein the predetermined temperature is in a range from 320 to 380° C.

* * * * *